US009150968B2

(12) United States Patent
Adzic et al.

(10) Patent No.: US 9,150,968 B2
(45) Date of Patent: Oct. 6, 2015

(54) PLATINUM-BASED ELECTROCATALYSTS SYNTHESIZED BY DEPOSITING CONTIGUOUS ADLAYERS ON CARBON NANOSTRUCTURES

(71) Applicant: Brookhaven Science Associates, LLC, Upton, NY (US)

(72) Inventors: Radoslav R. Adzic, East Setauket, NY (US); Alexander Harris, East Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 320 days.

(21) Appl. No.: 13/775,674

(22) Filed: Feb. 25, 2013

(65) Prior Publication Data

US 2013/0177715 A1  Jul. 11, 2013

Related U.S. Application Data

(63) Continuation of application No. 12/709,836, filed on Feb. 22, 2010, now Pat. No. 8,404,613, which is a continuation-in-part of application No. 12/603,216, filed on Oct. 21, 2009, now Pat. No. 8,699,207.

(60) Provisional application No. 61/155,178, filed on Feb. 25, 2009, provisional application No. 61/107,048, filed on Oct. 21, 2008.

(51) Int. Cl.
*B05D 3/00*         (2006.01)
*C08J 7/04*         (2006.01)
*H05H 1/32*         (2006.01)
*C23C 28/02*        (2006.01)
*B82Y 30/00*        (2011.01)
*B82Y 40/00*        (2011.01)

(Continued)

(52) U.S. Cl.
CPC ............... *C23C 28/02* (2013.01); *B01J 21/185* (2013.01); *B01J 23/42* (2013.01); *B01J 23/44* (2013.01); *B01J 23/60* (2013.01); *B01J 23/892* (2013.01); *B01J 23/8926* (2013.01); *B01J 35/0006* (2013.01); *B01J 35/008* (2013.01); *B01J 35/0033* (2013.01); *B01J 37/348* (2013.01); *B82Y 30/00* (2013.01); *B82Y 40/00* (2013.01); *C01B 31/0293* (2013.01); *C23C 28/321* (2013.01); *C23C 28/322* (2013.01); *C23C 28/34* (2013.01); *C23C 28/345* (2013.01); *C23C 28/347* (2013.01); *C23C 28/42* (2013.01); *H01G 11/24* (2013.01); *H01G 11/36* (2013.01); *H01M 4/92* (2013.01); *H01M 4/926* (2013.01); *B01J 23/56* (2013.01); *Y02E 60/13* (2013.01); *Y02E 60/50* (2013.01)

(58) Field of Classification Search
None
See application file for complete search history.

*Primary Examiner* — Bijay Saha
(74) *Attorney, Agent, or Firm* — Dorene M. Price; Lars O. Husebo

(57) ABSTRACT

High-surface-area carbon nanostructures coated with a smooth and conformal submonolayer-to-multilayer thin metal films and their method of manufacture are described. The manufacturing process may involve initial oxidation of the carbon nanostructures followed by immersion in a solution with the desired pH to create negative surface dipoles. The nanostructures are subsequently immersed in an alkaline solution containing non-noble metal ions which adsorb at surface reaction sites. The metal ions are then reduced via chemical or electrical means and the nanostructures are exposed to a solution containing a salt of one or more noble metals which replace adsorbed non-noble surface metal atoms by galvanic displacement. Subsequent film growth may be performed via the initial quasi-underpotential deposition of a non-noble metal followed by immersion in a solution comprising a more noble metal. The resulting coated nanostructures may be used, for example, as high-performance electrodes in supercapacitors, batteries, or other electric storage devices.

19 Claims, 5 Drawing Sheets

(51) Int. Cl.

| | | | |
|---|---|---|---|
| *C01B 31/02* | (2006.01) | *B01J 35/00* | (2006.01) |
| *H01G 11/36* | (2013.01) | *B01J 21/18* | (2006.01) |
| *H01M 4/92* | (2006.01) | *B01J 23/42* | (2006.01) |
| *C23C 28/00* | (2006.01) | *B01J 23/44* | (2006.01) |
| *H01G 11/24* | (2013.01) | *B01J 23/60* | (2006.01) |
| *B01J 37/34* | (2006.01) | *B01J 23/89* | (2006.01) |
| | | *B01J 23/56* | (2006.01) |

PLATINUM-BASED ELECTROCATALYSTS SYNTHESIZED BY DEPOSITING CONTIGUOUS ADLAYERS ON CARBON NANOSTRUCTURES

CROSS-REFERENCE TO RELATED APPLICATIONS

This application is a divisional application of U.S. patent application Ser. No. 12/709,836, now U.S. Pat. No. 8,404,613 filed on Feb. 22, 2010, which claims priority under 35 U.S.C. §119(e) to U.S. Provisional Patent Appl. No. 61/155,178 which was filed on Feb. 25, 2009, and is a continuation-in-part of and claims priority under 35 U.S.C. §120 to co-pending U.S. patent application Ser. No. 12/603,216 which was filed on Oct. 21, 2009 and which, in turn, claims priority under 35 U.S.C. §119(e) to U.S. Provisional Patent Appl. No. 61/107,048 which was filed on Oct. 21, 2008, the entirety of all of which are incorporated by reference as if fully set forth in this specification.

STATEMENT OF GOVERNMENT RIGHTS

The present invention was made with Government support under contract number DE-AC02-98CH10886, awarded by the U.S. Department of Energy. The Government has certain rights in the invention.

BACKGROUND

I. Field of the Invention

This invention relates generally to the field of nanoparticle electrocatalysts. In particular, the present invention relates to the controlled deposition of a smooth and conformal catalytically active surface layer on high-surface-area carbon nanostructures. This invention further relates to the use of these coated nanostructures as electrocatalysts in energy conversion devices such as fuel cells, batteries, capacitors, and supercapacitors.

II. Background of the Related Art

The emerging global energy crisis has resulted in a renewed interest in the development of new and improved energy conversion devices. The production of useful energy generally requires the transformation of an energy source from one state into another state which is capable of being used by the consumer. Improvements in conversion efficiency enable production of larger quantities of useful energy from a given quantity available from an energy source. Some examples of present-day energy conversion devices include capacitors, batteries, supercapacitors, and fuel cells. Each of these will, along with some of their associated problems, be briefly discussed below.

In its simplest form, a capacitor is an energy storage device comprised of two conducting plates separated by an insulating layer. When a voltage is applied to the plates, positive and negative charges are induced on opposite surfaces and an electric field is generated. The ability of a capacitor to store electrical charge is defined as its capacitance which is directly proportional to the polarizability of the insulating layer and the surface area of the plates, but is inversely proportional to the separation between the plates. Thus, the larger the plate surface area, the greater the polarizability of the insulating medium; and, the smaller the plate separation, the greater the resulting capacitance.

Batteries, on the other hand, generally produce electrical energy by the oxidation and reduction of electrochemical reagents within the battery. In this case the energy storage and conversion process is Faradaic because electron transfer between the electrodes occurs. Charge storage in capacitors is generally non-Faradaic since the storage of electrical charge is fully electrostatic with no electron transfer occurring across the electrode interface. While batteries are capable of attaining high energy densities over a wide range of voltages, they cannot attain high power densities and can only undergo a limited number of recharge cycles. Capacitors can provide high energy transfer rates with a nearly unlimited number of recharge cycles, but have limited charge storage capabilities.

Advances in energy storage devices eventually led to the development of the electric double-layer capacitor which is also known as an electrochemical capacitor or supercapacitor. A supercapacitor is an electrochemical energy storage device which combines the high energy storage capabilities of a battery with the high power and nearly unlimited recharging cycles attainable with a capacitor. A comprehensive review of the development and operation of supercapacitors is provided by B. E. Conway in "Electrochemical Supercapacitors: Scientific Fundamentals and Technological Applications," Kluwer Academic/Plenum Publishers, NY (2003) the entire contents of which is incorporated by reference as if fully set forth in this specification.

A supercapacitor is generally comprised of opposing porous, yet polarizable electrodes which are interspersed with an electrolyte and separated by an exceedingly thin, yet insulating and porous separator layer. The electrodes themselves are typically comprised of a porous material having a very large surface area. This assembly is situated between two opposing current collectors, each of which is in contact with an outer surface of an electrode. The exceedingly thin separator layer combined with the large surface area of the electrodes yields a device with an extraordinarily high capacitance.

Nanoporous electrode materials such as graphite, carbon fibers, charcoal, vitreous carbon, carbon aerogels, and activated carbon have previously been employed as supercapacitor electrodes. Factors which affect the charge storage efficiency of such carbon-containing electrodes include the availability of surface area for the accumulation of charge, electrolyte accessibility to intrapore surfaces, electrical conductivity within porous matrices, as well as the chemical stability and electrical conductivity of the electrode itself. Activated carbon is commonly employed as the electrode material due to its relatively large specific surface area which is on the order of 1000 to 2000 $m^2/g$. However, its small pore size (typically a few nm in diameter) makes it difficult for ions in the electrolyte to access intrapore surfaces. Furthermore, the use of insulating polymeric binders to fabricate the electrodes is detrimental to performance because it increases the resistance of the electrode.

Some of the problems associated with activated carbon may be circumvented by using carbon nanotubes as the electrode material. Carbon nanotubes are nanometer-scale cylindrical structures comprised entirely of $sp^2$ bonded carbon atoms. Although the specific surface area of carbon nanotubes may be considerably lower than that of activated carbon or carbon fiber, electrodes with a higher capacitance per unit surface area and lower internal resistance can be obtained. This is due primarily to the larger pore structure of carbon nanotube aggregates which permit greater accessibility to the available surface area. However, access to inner wall surfaces of nanotubes is inhibited by the small diameter of the tube ends and its proportionally larger length.

A still higher capacitance may be obtained using carbon nanohorns which have a structure analogous to nanotubes, but with one end of the cylindrical tube closed and the other open, resulting in a horn-like shape. Because carbon nanohorns have a more open structure, both the internal and outer surfaces of carbon may be made accessible to adsorbates. Consequently carbon nanohorns generally possess a higher specific surface area than carbon nanotubes and an average pore size (on the order of tens of nm) which is larger than both carbon nano tubes and activated carbon or carbon fibers.

From among available metal electrocatalysts, ruthenium exhibits the most potential for improving the storage capability because of its multivalent states which permit greater charge storage through an oxidation reaction wherein $Ru \rightarrow Ru^{4+}$. Furthermore, Ru remains adsorbed, on the surface even after undergoing a change in oxidation state. The utilization of Ru is, however, inhibited by the high cost and scarcity of Ru as well as the toxicity of its oxides. Controlled deposition of smooth, conformal thin films of Ru in the submonolayer to multilayer thickness range is also difficult to achieve. This is primarily due to the tendency of Ru to form films having a high surface roughness with granular nanoparticles dispersed across its surface.

While batteries, capacitors, and supercapacitors operate by releasing a finite amount of stored energy, a fuel cell has the advantage of being able to operate continuously. A fuel cell is itself an electrochemical device which operates by converting the chemical energy of a fuel and an oxidant into electrical energy. A standard fuel cell is comprised of an anode and cathode separated by a conducting electrolyte which electrically insulates the electrodes yet permits the flow of ions between them. The fuel cell operates by separating electrons and ions from the fuel at the anode and transporting the electrons through an external circuit to the cathode. The ions are concurrently transported through the electrolyte to the cathode where the oxidant is combined with the ions and electrons to form a waste product. An electrical circuit is completed by the concomitant flow of ions from the anode to cathode via the conducting electrolyte and the flow of electrons from the anode to the cathode via the external circuit.

The science and technology of fuel cells has received considerable attention, being the subject of numerous books and journal articles including, for example, "Fuel Cells and Their Applications," by K. Kordesch and G. Simader, New York, N.Y.: VCH Publishers, Inc. (2001). Although there are various types of fuels and oxidants which may be used, the most significant is the $H_2$—$O_2$ system. In a hydrogen-oxygen fuel cell, hydrogen ($H_2$) is supplied to the anode as the fuel where it dissociates into $H^+$ ions and provides electrons to the external circuit. Oxygen ($O_2$) supplied to the cathode undergoes a reduction reaction in which $O_2$ combines with electrons from the external circuit and ions in the electrolyte to form $H_2O$ as a byproduct. The overall reaction pathways leading to oxidation at the anode and reduction at the cathode are strongly dependent on the materials used as the electrodes and the type of electrolyte.

Under standard operating conditions the $H_2$ and $O_2$ oxidation/reduction reactions proceed very slowly, if at all, requiring elevated temperatures and/or high electrode potentials to proceed. Reaction kinetics at the electrodes may be accelerated by the use of metals such as platinum (Pt), palladium (Pd), ruthenium (Ru), and related noble metal alloys. Electrodes formed of these materials function as electrocatalysts since they accelerate electrochemical reactions at electrode surfaces yet are not themselves consumed by the overall reaction. Further improvements have been attained by incorporating noble metal-containing particles or structures with reduced dimensions. A reduction to nanoscale dimensions yields a significant increase in the surface-to-volume ratio, thereby producing a concomitant increase in the surface area available for reaction. Despite the performance improvements attainable with nanoscale electrocatalysts, successful commercialization of fuel cells requires still further increases in performance and cost efficiency.

Pt has been shown to be one of the best electrocatalysts, but its successful implementation in commercially available fuel cells is hindered by its extremely high cost, susceptibility to carbon monoxide (CO) poisoning, poor stability under cyclic loading, and the relatively slow kinetics of $O_2$ reduction at the cathode. A variety of approaches have been employed in attempting to solve these problems. An example is U.S. Pat. No. 6,232,264 to Lukehart, et al. which discloses polymetallic nanoparticles such as platinum-palladium alloy nanoparticles for use as fuel cell electrocatalysts. Another example is U.S. Pat. No. 6,670,301 to Adzic, et al. which discloses a process for depositing a thin film of Pt on dispersed Ru nanoparticles supported on carbon substrates. These approaches have resulted in electrocatalysts with reduced Pt loading and a higher tolerance for CO poisoning. Both of the aforementioned patents are incorporated by reference as if fully set forth in this specification.

Attempts to accelerate the oxygen reduction reaction (ORR) on Pt while simultaneously reducing Pt loading have been met with limited success. Recent approaches have utilized high surface area Pt or Pd nanoparticles supported by nanostructured carbon (Pt/C or Pd/C) as described, for example, in U.S. Pat. No. 6,815,391 to Xing, et al., which is incorporated by reference as if fully set forth in this specification. However, as an oxygen reduction catalyst, bulk Pt is still several times more active than Pt/C and Pd/C nanoparticle electrocatalysts. Another approach involves the use of Pt-encapsulated core-shell or alloy nanoparticles as described, for example, in U.S. Patent Publ. No. 2007/0031722 to Adzic, et al., which is incorporated by reference as if fully set forth in this specification. The quantity of noble metal required was reduced even further by using a core-shell nanoparticle with a noble metal shell, but a non-noble metal core.

Despite the continued improvement attained with modern nanoparticle electrocatalysts, successful implementation in commercial energy conversion devices requires still further increases in the catalytic activity while simultaneously improving long-term stability and reducing the amount of costly precious metals required.

SUMMARY

In view of the above-described problems, some embodiments of the present invention provide a method of controllably depositing submonolayer-to-multilayer smooth and conformal thin films of a catalytically active layer onto high-surface-area carbon nanostructures. In one embodiment, this is accomplished by a new synthetic procedure which involves the initial surface oxidation of a nanostructured carbon substrate followed by cation adsorption onto the oxidized substrate, electrochemical reduction of the cations, and displacement of the metal adatoms by a more noble metal. This results in the formation of a surface layer of the more noble metal which exhibits improved stability, electrochemical reactivity, and reduced impurity levels. The method combines the advantages of high surface areas attainable from nanostructured carbon with the electrocatalytical properties possible with a catalytically active overlayer having an atomic-level thickness.

The carbon nanostructures may be any type of physical structure formed from covalently bonded carbon atoms. This includes, but is not limited to single- and multi-walled carbon nanotubes, nanohorns, nanocones, nanoparticles, nanofibers, fullerenes, and any other carbon structure as is well-known in the art. In a preferred embodiment the nano structures are carbon nanohorns. The conical, open structure of carbon nanohorns is advantageous in that it facilitates deposition on both inside and outside surfaces of the carbon layers forming the nanohorn. Aggregates of carbon nanohorns also provide a larger distribution of pore sizes, thereby permitting still greater access to intrapore surfaces. Aggregates of carbon nanostructures conformally coated with a thin film of a catalytically active layer may be fabricated into an electrode.

In one embodiment the surface of the carbon nanostructures is coated with a thin film of a catalytically active surface layer using a method which involves initially oxidizing the surfaces of the carbon nano structures and then forming a dipole at the surface. This is followed by the adsorption and subsequent reduction of metal ions on the surface of the carbon nanostructures. A thin film of the desired transition metal which functions as the catalytically active surface layer is then formed by immersing the carbon nanostructures in a salt comprising the transition metal. Since the transition metal salt is more noble than the adsorbed metal, deposition occurs by galvanic displacement of the adsorbed metal by the transition metal salt.

The catalytically active surface layer is preferably a contiguous thin film which encapsulates the carbon nanostructures with a surface coverage ranging from less than a monolayer to several monolayers. The film thickness is therefore selected from the group consisting of an atomic submonolayer, monolayer, and multilayer. Multilayer film thickness comprise two or more atomic layers and may, for example, be a bilayer or trilayer. The surface layer is preferably a noble metal, but may be alloyed with one or more transition metals, including other noble metals. The composition of the surface layer is preferably homogeneous, but may also be nonuniform. In an especially preferred embodiment the catalytically active surface layer comprises Pt or Pt alloyed with at least one other transition metal.

In still another embodiment the carbon nanostructures are initially coated with a shell of a transition metal or transition metal alloy. The shell is preferably atomically thin, having a thickness on the nanoscale and is comprised of Pd, either alone or alloyed with another transition metal. In alternate preferred embodiments the shell may be comprised of one or more noble metals, including Pt alloys, gold (Au), or Au alloys. The shell itself may be deposited by the oxidation, ion adsorption, electrochemical reduction of cations, and displacement method used to form a thin film of a catalytically active surface layer as described above. The thickness of the shell may be increased by conventional deposition processes which include, but are not limited to electroless deposition and electroplating.

In yet another embodiment deposition of a noble metal shell layer may be preceded by a coating comprising a transition metal such as Cu, nickel (Ni), or zinc (Zn). Initial shell formation is followed by the deposition of a catalytically active surface layer. This is preferably accomplished by displacement of a quasi-underpotentially deposited transition metal such as a Cu adlayer by a more noble metal. The catalytically active surface layer is preferably Pt or a Pt alloy due to their high catalytic activity. The inclusion of a shell layer between the underlying nanostructured carbon and the catalytically active surface layer improves the stability, long term viability, and activity of the surface layer.

Another embodiment relates to the use of carbon nanostructures coated with a contiguous thin film of a catalytically active surface layer as electrodes. Still another embodiment relates to electrodes comprising carbon nanostructures having a shell of a transition metal coated with a contiguous thin film of a catalytically active surface layer. Such coated nanostructures facilitate more efficient and cost-effective electrochemical energy conversion in electrochemical devices fabricated from these structures. Such an electrode may be used, for example, in energy conversion devices such as fuel cells, batteries, capacitors, and supercapacitors.

DETAILED DESCRIPTION

Figure 1:
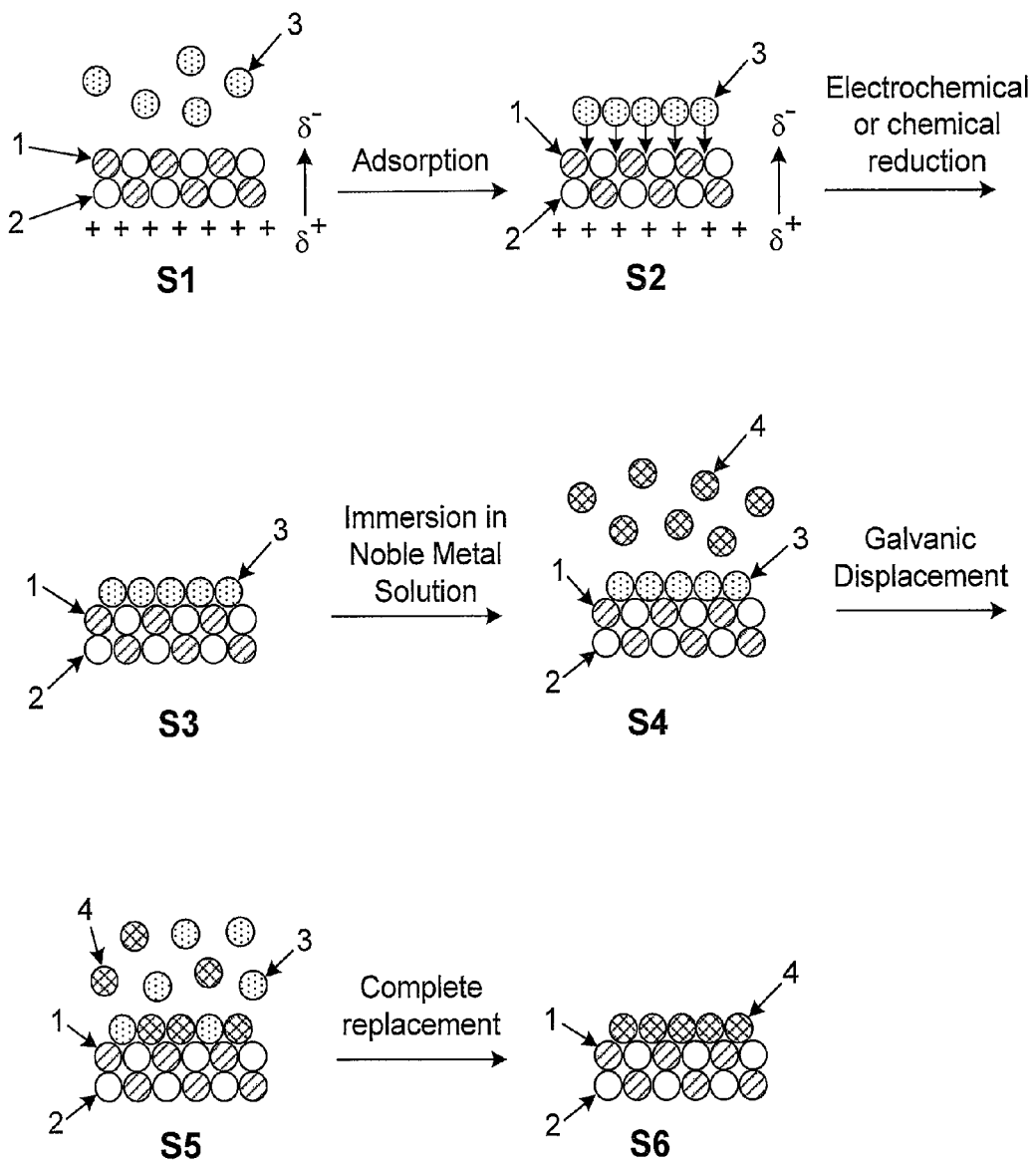
FIG. 1 illustrates the sequence of steps and accompanying surface chemical reactions which lead to deposition of a monatomic layer of the desired noble metal onto the oxidized surface of a carbon nanostructure.

These and other objectives of the invention will become more apparent from the following description and illustrative embodiments which are described in detail with reference to the accompanying drawings. In the interest of clarity, in describing the present invention, the following terms and acronyms are defined as provided below.

ACRONYMS

ALD: Atomic Layer Deposition
CVD: Chemical Vapor Deposition
MBE: Molecular Beam Epitaxy
ML: Monolayer
MWNT: Multi-Walled NanoTube
ORR: Oxidation Reduction Reaction
PVD: Physical Vapor Deposition
SWNT: Single-Walled NanoTube
TEM: Transmission Electron Microscope
UPD: Under Potential Deposition

DEFINITIONS

Adatom: An atom located on the surface of an underlying substrate.
Adlayer: A layer of (atoms or molecules) adsorbed to the surface of a substrate.
Bilayer: Two consecutive layers (of atoms or molecules) which occupy substantially all available surface sites on each layer and coat the entire surface of the substrate.
Catalysis: A process by which the rate of a chemical reaction is increased by means of a substance (a catalyst) which is not itself consumed by the reaction.
Electrocatalysis: The process of catalyzing a half cell reaction at an electrode surface.

Electrodeposition: Another term for electroplating.

Electrolyte: A substance comprising free ions which behaves as an electrically conductive medium.

Electroplating: The process of using an electrical current to reduce cations of a desired material from solution to coat a conductive substrate with a thin layer of the material.

Monolayer: A single layer (of atoms or molecules) which occupies available surface sites and covers substantially the entire exposed surface of the substrate.

Multilayer: More than one layer (of atoms or molecules) on the surface, with each layer being sequentially stacked on top of the preceding layer.

Nanocomposite: A material created by introducing a nanoparticulate filler material into a macroscopic sample material.

Nanohorn: A nanotube which has one end sealed and the other open to form a cone or horn-like shape.

Nanotube: A nanometer-scale tube-like structure.

Nanostructure: Any manufactured structure or particle with nanometer-scale dimensions.

Nanoparticle: Any manufactured structure or particle with nanometer-scale dimensions (i.e., 1-100 nm) along at least one of three orthogonal directions.

Noble metal: Metals which are extremely stable and inert, being resistant to corrosion or oxidation. These generally comprise ruthenium (Ru), rhodium (Rh), palladium (Pd), silver (Ag), rhenium (Re), osmium (Os), iridium (Ir), platinum (Pt), and gold (Au). Noble metals are frequently used as a passivating layer.

Non-noble metal: A metal which is not a noble metal.

Redox reaction: A chemical reaction in which an atom undergoes a change in oxidation number. This typically involves the loss of electrons by one entity accompanied by the gain of electrons by another entity.

Refractory metal: A class of metals with extraordinary resistance to heat and wear, but with generally poor resistance to oxidation and corrosion. These generally comprise tungsten (W), molybdenum (Mo), niobium (Nb), tantalum (Ta), and rhenium (Re).

Submonolayer: Surface (atom or molecular) coverages which are less than a monolayer.

Transition metal: Any element in the d-block of the periodic table which includes groups 3 to 12.

Trilayer: Three consecutive layers (of atoms or molecules) which occupy substantially all available surface sites in each layer and coat the entire surface of the substrate.

The present invention is directed to a method for controllably depositing a submonolayer to multilayer smooth and conformal thin film of a catalytically active layer onto nanostructured carbon substrates. The method is particularly suitable for, but is not limited to, deposition onto carbon substrates which possess a very high specific surface area. This includes highly oriented pyrolytic graphite (HOPG) and carbon nanostructures such as, for example, nanoparticles, nanotubes, fullerenes, nanocones, and/or nanohorns. Since the number of catalytically active surface sites is proportional to the available surface area, the reaction kinetics of a substrate may be increased by utilizing high-surface-area nano structures which are conformally coated with a smooth layer of an electroactive material. In this regard, carbon nanostructures are especially advantageous since they provide a high specific surface area and may be easily fabricated.

Within this specification, the primary carbon nanostructures discussed are carbon nanotubes and nanohorns. It is, however, to be understood that the nanostructures used are not limited to these particular structures. Carbon nanotubes are identified as nanometer-scale cylindrical structures of indeterminate length comprised entirely of $sp^2$-bonded carbon atoms. The nanotube may be a single-walled nanotube (SWNT) or a multi-walled nanotube (MWNT). When a SWNT is unrolled it produces a single atomic layer of carbon atoms arranged in a two-dimensional hexagonal lattice. Such an atomic layer is known as graphene. Although the specific surface area of carbon nanotubes may be considerably lower than that of other forms of carbon such as activated carbon or carbon fiber, the larger pore structure of carbon nanotube aggregates permits greater accessibility to the available surface area. However, access to inner wall surfaces of nanotubes is inhibited by the small diameter of the tube ends and its proportionally larger length.

A higher specific surface area may be obtained using carbon nanohorns which have a structure analogous to nanotubes, but with one end of the cylindrical tube closed and the other open, resulting in a horn-like shape. Since carbon nanohorns have a more open structure, both the internal and outer surfaces of the carbon may be made accessible to adsorbates. Consequently carbon nanohorns generally possess a higher specific surface area than carbon nanotubes and an average pore size (on the order of tens of nm) which is larger than both carbon nanotubes and activated carbon or carbon fibers.

Catalytically active surface sites are provided by depositing a thin film of one or more catalytically active noble metals. The deposition process is centered around a series of electrochemical reactions which, when performed sequentially, result in a smooth and continuous film with the targeted metal coverage and composition. The process offers unprecedented control over film growth and is advantageous in terms of its versatility, reproducibility, and efficient utilization of source material. Platinum has been shown to be one of the most catalytically active, yet most expensive metals. The ratio of catalytically active Pt surface sites to the total number of Pt atoms may be maximized by employing Pt-coated carbon nanostructures. The present invention exploits the advantages inherent to Pt and carbon nanostructures by presenting a simple, yet robust method to deposit smooth and conformal thin films of Pt onto a substrate comprised of carbon nanostructures possessing a high specific surface area.

The stability and long-term viability of coated carbon nanostructure electrocatalysts may be further improved by forming a contiguous metal shell prior to deposition of a catalytically active surface layer such as Pt. The underlying metal shell is formed directly onto the surface of the carbon nanostructures while the catalytically active overlayer is deposited onto the thus-formed metal shell. These layers are preferably formed using electrochemical deposition processes which will be described in detail below. The shell itself is preferably a noble metal or a noble metal alloy and may comprise one or a plurality of atomic layers. The thickness of the thus-formed shell may be increased by subsequent electrochemical or other thin film growth techniques including, for example, conventional electroless deposition or electroplating processes which are well-known in the art.

In a preferred embodiment the shell comprises one of a Pt alloy, Au or a Au alloy, Pd or a Pd alloy having a thickness of at least one monolayer. In an even more preferred embodiment, the electrocatalyst comprises carbon nanohorns covered with a shell of at least a monolayer of Pd which, in turn, is coated with an atomically thin film of Pt. In another embodiment, an initial layer of copper (Cu), nickel (Ni), or zinc (Zn) atoms is deposited onto the surface of the carbon nanostructures and is, in turn, coated by a thin film of a noble metal or noble metal alloy. Such a dual-layer shell structure is then covered by a catalytically active layer. This produces an electrocatalyst comprised of a carbon nanostructure coated with a transition metal-noble metal dual layer shell followed by a catalytically active layer. An example would be a Pt/Pd/Ni/C nanostructure. The inclusion of a shell between the carbon nanostructure and the catalytically active layer improves the degree of surface coverage, long-term stability, and activity of the electrocatalyst.

I. Carbon Nanostructure Synthesis

A variety of techniques have been developed to produce carbon nanostructures in significant quantities. These include, but are not limited to arc discharge, laser ablation, chemical vapor deposition (CVD), as well as natural combustion processes. From among these, one of the most widely used processes for fabricating carbon nanostructures is the arc discharge process which involves application of a large current to a graphite electrode to produce an electric arc. Carbon nanostructures may then be collected from the soot generated by the discharge. Laser ablation involves using a pulsed laser to vaporize a graphite target in a high temperature reactor chamber under an inert gas environment. The nanostructures form on cooler surfaces within the chamber as the vaporized carbon condenses. The nanostructures formed by these process may include but are not limited to single-walled nanotubes (SWNT), multi-walled nanotubes (MWNT), nanohorns, nanocones, nanoparticles, nanofibers, graphene, fullerenes, and any other type of carbon-containing nanostructure. By varying the growth conditions it is possible to form carbon nanostructures with the desired structure, size, and orientation.

CVD growth of carbon nanotubes involves initial preparation of a substrate comprising a layer of metal nanoparticles such as nickel, cobalt, iron, or combinations thereof which serve as a catalyst. The location and size of the metal nanoparticles may be controlled by standard photolithography masking techniques combined with deposition, etching, and annealing of the metal layer. The size and structure of the resulting nanotubes is influenced by the diameter and composition of the metal nanoparticles. The substrate itself is placed in a suitable reactor vessel and heated to approximately 700° C. Growth is initiated by introducing process gases such as ammonia ($NH_3$), nitrogen ($N_2$), or hydrogen ($H_2$) and a carbon-containing gas such as acetylene ($C_2H_2$), ethylene ($C_2H_4$), ethanol ($C_2H_6O$), or methane ($CH_4$) to the reactor chamber. Nanotube growth itself occurs at the sites of the metal catalysts. CVD growth of nanotubes may be supplemented by the application of a strong magnetic field (e.g., plasma-enhanced CVD) which promotes nanotube growth parallel to the direction of the magnetic field.

From among the techniques discussed above, CVD shows the most promise for the synthesis of carbon nanotubes due to its favorable cost/yield ratio and the ability to grow nanotubes directly on the desired substrate. One issue associated with CVD is the need to remove the metal catalyst following nanotube growth. This is typically accomplished by an acid treatment which has the potential to damage the nanotube structure. A comprehensive review of recent advances in the synthesis of carbon nanostructures may be found, for example, in "Carbon Nanotubes: Advanced Topics in the Synthesis, Structure, Properties and Applications," edited by A. Jorio, G. Dresselhaus, and M. S. Dresselhaus, New York, N.Y.: Springer-Verlag (2008), the entire contents of which is incorporated by reference as if fully set forth in this specification.

It was recently discovered that under certain conditions laser ablation of a graphite target rod produces carbon nanoparticles with a horn-like structure. These carbon nanostructures were termed nanohorns and were fabricated, for example, by laser ablation of a carbon target under an inert gas ambient using a $CO_2$ laser instead of a conventional Nd:YAG laser. The growth process itself was performed at room temperature in an argon (Ar) gas atmosphere at a pressure of 760 Torr as described, for example, by S. Iijima, et al. in "Nano-aggregates of single-walled graphitic carbon nanohorns," Chem. Phys. Lett., 309, 165 (1999) and U.S. Patent Application No. 2007/0003469 to T. Azami, et al. (hereinafter "Azami"), the entire contents of both of which are incorporated by reference as if fully set forth in this specification.

The resulting carbon nanohorns tend to cluster together to form spherical particles resembling a dahlia flower approximately 10 to 100 nm in diameter. The particles are comprised of aggregates of carbon nanohorns, each of which has a cone-like tubular structure that is capped at one end and open at the other. The cone tip forms an average angle of 20° and may extend up to 20 nm from the edge of the aggregate. The average length of individual nanohorns is 30 to 50 nm with a diameter of approximately 2 nm. Large quantities of these aggregates form a fine, black powder which may be used to manufacture electrodes for use in electrical devices.

Carbon nanohoms offer several advantages over nanotubes, both in terms of their properties and fabrication. Since conventional carbon nanotubes are generally only a few nm in diameter, access to inner wall surfaces is highly physically constrained. On the other hand, carbon nanohoms are open-ended, thereby making a larger fraction of their surface available as reaction sites. When spherical aggregates of carbon nanohorns are assembled into a three-dimensional network, fine pores on the order of tens of nanometers are formed between the aggregates themselves. These pores are larger than those found in activated carbon (which are typically only a few nm), thereby permitting greater physical access to intrapore surfaces. In addition to the increase in accessible surface area, carbon nanohorns have the added advantage of ease of synthesis since they can be easily fabricated without the aid of a catalyst. The larger pore size of carbon nanohorns enables the deposition of thin conformal metal or oxide films on the surfaces of these nanostructures.

II. Thin Film Growth

After synthesizing the carbon nanostructures by any of a plurality of suitable means as identified in Section I above, one or more atomically thin films of the desired metals are deposited onto the nanostructure surfaces to form smooth, conformal coatings. Conventionally this may be accomplished using thin film deposition techniques which include, but are not limited to, electrodeposition, atomic layer deposition (ALD), reductive chemical methods in a liquid phase, CVD, and physical vapor deposition (PVD).

A. Vapor Phase Deposition Processes

Film growth by ALD occurs through a series of low temperature surface chemical reactions wherein the substrate is exposed to alternating pulses of a precursor and reactant gas within a process chamber. The process chamber is purged with an inert gas such as nitrogen ($N_2$) between pulses. The deposition process is self-limiting with each cycle resulting in the deposition of a single atomic layer of the desired element or compound. As an example, ALD has been used to deposit ruthenium (Ru) thin films onto carbon nanotubes as described in U.S. Pat. No. 7,005,391 to Min, et al. (hereinafter "Min") and by Y.-S. Min, et al. in "Ruthenium Oxide Nanotube Arrays Fabricated by Atomic Layer Deposition Using a Carbon Nanotube Template," Adv. Mater. 15, 1019 (2003) the entire contents of all of which are incorporated by reference as if fully set forth in this specification.

The relatively small diameter of carbon nanotubes combined with their significant lengths means that access to inside surfaces is highly physically constrained. Consequently, film growth on inner wall surfaces either does not occur or proceeds at a reduced rate compared to the outer cylindrical surface. This results in significant and undesirable nonuniformities in the surface coverage.

Deposition of thin films of a noble metal by CVD generally requires elevated temperatures in order for surface reactions to proceed at appreciable rates. ALD and CVD growth of noble metal thin films is generally complicated by nonuniformities in surface coverages and increased surface roughness during the initial stages of growth. Attempts to deposit Ru thin films with improved step coverages and reduced surface roughness by thermal and plasma-enhanced CVD are described, for example, in U.S. Pat. No. 6,734,100 to Park, et al. (hereinafter "Park") and U.S. Pat. No. 6,750,092 to Won, et al. (hereinafter "Won") the entire contents of all of which is incorporated by reference as if fully set forth in this specification. A wide variety of precursor gases other than those disclosed by Min, Park, or Won may be used during gas-phase growth. The precursors may be selected based on the desired structure and composition of the deposited thin film.

Deposition of noble metal thin films by PVD techniques such as evaporation, laser-ablation, or sputtering may provide a dense, smooth layer, but are generally limited in that deposition only occurs on surfaces which have substantially a direct line-of-sight with the source material. Thus, when film growth is to be performed on three-dimensional structures, PVD techniques generally will not result in continuous, conformal thin films. ALD, CVD, and PVD techniques generally do not facilitate efficient utilization of the source material since deposition also occurs on the walls and other objects within the process chamber.

B. Electrochemical Deposition Processes

Conventional chemical thin film growth methods involve initial adsorption of metal ions on the substrate surface followed by chemical reduction by means of a reducing agent or electrical reduction by application of a reducing potential. A variety of chemical methods for depositing a metal adlayer have been described, for example, in U.S. Patent Appl. No. 2007/0264189 to Adzic, et al. (hereinafter "Adzic") which is incorporated by reference as if fully set forth in this specification. As an illustrative example, electrodeposition of Ru onto carbon nanotubes is described, for example, by I.-H. Kim (hereinafter "Kim") in "Synthesis And Characterization Of Electrochemically Prepared Ruthenium Oxide On Carbon Nanotube Film Substrate For Supercapacitor Applications," J. Electrochem. Soc. 152, A2170 (2005) which is incorporated by reference as if set forth in this specification.

In an especially preferred embodiment, the desired catalytically active surface layer is deposited by a process in which a series of steps is designed to sequentially modify the surface chemistry of the underlying carbon nanostructures and culminate in the formation of an adlayer of the desired metal atoms. This process involves initially oxidizing the surfaces of the carbon nanostructures by any of a plurality of suitable methods which are well-known in the art.

i. Surface Oxidation

In one embodiment surface oxidation is achieved through thermal oxidation in an $O_2$ ambient which must be performed at low temperatures in order to avoid combustion of the carbon nanostructures by reaction with oxygen to form $CO_2$ at temperatures above approximately 400° C. In another embodiment, surface oxidation of carbon is accomplished by immersion in a solution comprising, for example, a suitably strong acid. This step serves not only to oxidize the surface, but also to functionalize it and remove undesired impurity materials. This process involves ultrasonically dispersing the nanostructures in, for example, a heated bath comprising nitric acid, chlorosulfonic acid, or potassium permanganate in a dilute sulfuric acid solution as described in U.S. Pat. No. 5,698,175 to Hiur, et al. which is incorporated by reference as if fully set forth in this specification.

In yet another embodiment the surface may be oxidized by electrochemical means. Immersion in a suitable solution and application of potentials ranging from 0.7 to 1.9 V at room temperature and above may be performed to yield a suitably oxidized surface.

In still another embodiment, oxidation is performed by immersing the nanostructures into a solution of a peroxygen-containing composition comprising organic peroxyacid, inorganic peroxoacid, hydroperoxide, or a salt thereof. This is described, for example, in U.S. Pat. No. 6,872,681 to Niu, et al. the entire contents of which is incorporated by reference as if fully set forth in this specification. The process results in the formation of oxidized nanostructures with carbon and oxygen-containing moieties such as carbonyl, carboxyl, aldehyde, ketone, hydroxyl, phenolic, esters, lactones, quinines, and their derivatives. This process also improves the dispersability in organic or inorganic solvents and water.

The oxidation process not only produces carbon-oxygen surface groups which serve as reaction sites for the adsorption of non-noble metal ions, but may also open small holes or nanowindows in individual carbon nanohorns which may have had their open end become enclosed due to aggregate formation with other nanohorns. The size and number of holes may be controlled by adjusting the oxidation conditions. In a preferred embodiment, oxidation is performed by immersion in an aqueous $H_2SO_4$ solution as disclosed, for example, by C.-M. Yang, et al. in "Nanowindow-Regulated Specific Capacitance of Supercapacitor Electrodes of Single-Wall Carbon Nanohoms," J. Am. Chem. Soc. 129, 20 (2007), the entire content of which is incorporated by reference as if fully set forth in this specification.

ii. Metal Ion Adsorption and Electrochemical Reduction

Growth of a smooth, conformal layer of the desired noble metal is accomplished by means of a sequence of electrochemical surface reactions, each of which is illustrated in FIG. 1. Once the carbon surface is suitably oxidized, non-noble metal ions are adsorbed on the surface. This is accomplished by initially immersing the carbon nanostructures in a solution which has been adjusted to a suitable pH such that a negative dipole pointing to the electrolyte is generated at the oxide surface. This may be accomplished, for example, by immersion in a 1:1 solution of sulfuric acid and nitric acid such that, as illustrated by step S1 in FIG. 1, a dipole $\delta^+ \rightarrow \delta^-$ is created on a surface comprising carbon (1) and oxygen (2) atoms. It is to be noted that the arrangement of carbon (1) and oxygen (2) atoms as shown in FIG. 1 is merely provided for the purpose of illustration. The actual bonding geometry of carbon (1) and oxygen (2) atoms will vary from the configuration shown. The creation of such a dipole enables adsorption of metal ions (3) on the surface. In addition to this simple adsorption mechanism (dipole-dipole interaction), metal ions may strongly interact with the surface to produce changes in valence state, undergo an ion-exchange process, or form a surface complex.

Once the surface of the oxidized nanostructures has been suitably prepared, they are immersed in a solution comprising either cations or anions of a non-noble metal (also shown in step S1). The solution is prepared such that it provides a stable supply of metal salts, being neither strongly acidic nor strongly alkaline. This avoids alteration of carbon surface groups and problems due to hydrolysis. The metal ions may, for example, be in the form of cations such as $Pb^{2+}$, $Zn^{2+}$, $Cu^{2+}$, $Bi^{3+}$, $Tl^+$, $Cd^{2+}$, $Ag^+$, $Sn^{2+}$, $Hg^+$, $Sb^{3+}$, $Se^{4+}$, or $Te^{4+}$ or their anionic forms. The metal cations (3) are attracted to the negative surface dipole $\delta^+ \rightarrow \delta^-$ such that they are adsorbed on the surface in step S2. By adjusting the solution temperature and exposure time, the desired quantity of metal cations can be adsorbed on the surface. Once this is complete, the substrate is emersed from the solution and rinsed with deionized water.

Once the metal ions are adsorbed on the surface they are reduced in step S3. This may be accomplished chemically by treatment with a reducing agent such as, for example, $NaBH_4$, citric acid, hypophosphorous acid, or hydrazine. Alternatively, reduction may be accomplished electrolytically. This is done by placing the carbon substrate on an electrode which is then immersed in a suitable pH-adjusted room-temperature (e.g., approximately 25° C.) solution and subject to a suitable reducing potential. The solution is used at room temperature since desorption may occur at higher temperatures and the pH is adjusted to avoid potential problems due to hydrolysis of the metal ions. The reducing potential is typically 0.3 to 1.0 V more negative than the standard reversible potential of deposition of the corresponding cation. Reduction of the metal ions removes the positive or negative charge previously associated with the ions.

The final step involves exposing the carbon substrate to a solution (step S4) containing a salt of one or more noble metals (4) which replace the adsorbed non-noble metal (3) by galvanic displacement (steps S5 and S6). This occurs through a redox reaction in which oxidation of the adsorbed non-noble metal (3) and reduction of the noble metal (4) contained in solution occur simultaneously. This process results in an exchange wherein the adsorbed non-noble metal (3) is desorbed from the surface and replaced with the noble metal (4). The noble metal salt is preferentially a salt of Pt such as $K_2PtCl_4$ or some other Pt-containing metal complex, but is not so limited and may also be a salt of Au, Pd, Ag, Ru, Rh, Os, Ir, or combinations thereof.

Each step in the overall deposition process may be adjusted to vary the resulting properties and coverage of the resulting thin film. This may be accomplished by, for example adjusting the solution pH, temperature, exposure duration, and/or concentration used at any of the preceding steps. The entire adsorption/displacement process may be repeated to obtain a desired film thickness. Once an initial metal layer is deposited it is possible to perform subsequent surface processes such as electroless deposition or conventional electroplating. The above-described process of adsorbing a non-noble metal ion followed by electrochemical reduction and displacement by a more noble metal is detailed by Adzic in U.S. Patent Appl. No. 2007/0264189 which is incorporated by reference as if fully set forth in this specification.

For purposes of this specification, a monolayer (ML) is formed when the surface of a material (the substrate) is covered by a single, closely packed layer comprising adatoms of a second material which forms a chemical or physical bond with atoms at the surface of the substrate. The surface is considered fully covered when substantially all available surface lattice sites are occupied by an adatom of the second material. If the surface of the substrate is not substantially completely covered by a single layer of the second material, then the surface coverage is considered submonolayer. However, if a second or subsequent layer of the adlayer material is deposited onto the first layer, then multilayer surface coverages result.

The metal ion adsorption, electrochemical reduction, and galvanic displacement process described in this section may be used to deposit a catalytically active layer directly onto the surface of nanostructured carbon substrates. Using this method, a contiguous, conformal, and atomically thick film of a noble metal such as Pt may be readily formed. In this manner, the advantages of using nanostructured carbon may be combined with the heightened catalytic activity of Pt while simultaneously minimizing Pt loading.

iii. Underpotential Deposition

Formation of an initial metal shell layer using any of the processes discussed supra facilitates subsequent film growth by a synthetic procedure which employs the principles of underpotential deposition (UPD) and galvanic displacement. This process has been utilized by Brankovic, et al. (hereinafter "Brankovic") to deposit a monolayer of Pt onto Au(111) substrates and by Zhang, et al. (hereinafter "Zhang") to deposit Pt monolayers onto Pd(111) and carbon-supported Pd nanoparticles. These procedures are described, for example, in "Metal Monolayer Deposition By Replacement Of Metal Adlayers On Electrode Surfaces," Surf. Sci., 474, L173 (2001) and in "Platinum Monolayer Electrocatalysts for $O_2$ Reduction: Pt Monolayer On Pd(111) And On Carbon-Supported Pd Nanoparticles," J. Phys. Chem. B 108, 10955 (2004), respectively. Each of the aforementioned references is incorporated by reference as if fully set forth in this specification.

The deposition process involves the initial formation of an adlayer of a metal onto a substrate by UPD. This is followed by the galvanic displacement of the adlayer by a more noble metal, resulting in the conformal deposition of a ML of the more noble metal on the substrate. The overall process involves the irreversible and spontaneous redox displacement of an adlayer of a non-noble metal by a more noble metal. This enables the controlled deposition of a thin, continuous layer of a desired metal. The process requires that the substrate metal be more noble than the metal undergoing deposition in order to avoid becoming oxidized. The redox reaction can be described by the following equation $$M_{UDP}^0 + (m/z)L^{z+} \Rightarrow M^{m+} + (m/z)L^0 \quad (1)$$

where $M_{UDP}^0$ represents a UPD metal adatom on the electrode surface and $L^{z+}$ is a noble metal cation with positive charge z+ and valence z. The $M^{m+}$ represents the metal cation in the solution obtained after the UPD adatom was oxidized, and $L^0$ is a noble atom deposited in the redox process.

Although the catalytically active surface layer is not limited to any particular material, it is preferably Pt due to its excellent catalytic properties. Consequently, an example in which a ML of Pt is formed on carbon nanostructures using the processes described by Brankovic and Zhang will now be described in detail. It is to be understood, however, that the process is not limited to Pt and other metals may be utilized. The method involves the initial formation of a ML of a metal such as Cu by UPD in a solution comprised of 50 mM $CuSO_4$ in a 50 mM $H_2SO_4$ solution. The Cu-coated carbon-shell nanostructures are then emersed from solution and rinsed with deionized water to remove $Cu^{2+}$ ions from the surface. This is followed by immersion in a solution comprised of 1.0 mM $K_2PtCl_4$ in 50 mM $H_2SO_4$ under a nitrogen gas atmosphere for approximately two minutes to replace all Cu atoms with Pt atoms. The Pt-coated carbon-shell nanostructure substrate is again rinsed with deionized water. The above processes are carried out in a multi-compartment cell under a $N_2$ atmosphere in order to prevent Cu oxidation by $O_2$ during sample transfer.

This results in the conformal deposition of a ML of Pt on high-surface-area carbon-shell nano structures. The deposition cycle, comprising quasi-UPD of Cu followed by galvanic displacement with Pt, may be repeated as needed to produce two or more layers of Pt in order to ensure complete coverage of the carbon-shell nanostructure surface. Conversely, the UPD of Cu may be controllably limited such that submonolayer coverages of Cu and, hence, Pt are obtained. The metal overlayer used is not limited to Pt, but may be formed from other metals with the only requirement being that the desired metal be more noble than the UPD adlayer. This may be accomplished by contacting the copper-coated particles with their corresponding salts. For example, MLs of Pd, Ir, Ru, Os, Rh, Au, and Re can be deposited by displacement of a copper ML using $PdCl_2$, $IrCl_3$, $RuCl_3$, $OsCl_3$, $RhCl_3$, $AuCl_3$, or $ReCl_3$, respectively. Furthermore, the metal overlayer may be formed as an alloy with any number of constituents such as binary, ternary, quaternary, or quinary alloys with experimentally optimized stoichiometry ratios.

Since a costly precious metal such as Pt can be utilized as a thin film instead of in bulk form, significant cost savings can be attained. The utilization of a carbon-shell nanostructure may also provide unexpectedly heightened catalytic activity due to synergistic effects between the surface of the carbon-shell nanostructure and the catalytic overlayer. The unexpected increase in catalytic activity may arise due to electronic and geometric effects which arise from the formation of surface metal-metal bonds and the differing lattice constants of the catalytic overlayer and underlying substrate surface.

The above descriptions provide detailed explanations of the overall surface reaction pathways by which one or more transition metals may be controllably and conformably deposited onto the surface of carbon nanostructures. The resulting coated nano structures provide a large, continuous surface area of the catalytically active layer for surface reactions while minimizing loading. The process by which metal-coated carbon nanostructures are formed by the above deposition method will become clearer upon consideration of the following exemplary embodiment which describes preparation of Pt/C and Pt/Pd/C nanostructures.

III. Exemplary Embodiments

Carbon nanostructures conformally coated with a smooth adlayer of Pt formed either with or without a shell layer using the electrochemical deposition processes described above may be used, for example, as electrodes in energy conversion devices. Production of usable electrodes initially requires the formation of a suitable quantity of the desired carbon nanostructures is formed by any of the methods described in Section I. The nanostructures are preferentially carbon nanohorns which may be fabricated by ablation of a carbon substrate with a $CO_2$ laser at room temperature and under an ambient of Ar gas at 760 Torr as detailed in Azami. The resulting powder may then be collected and fabricated into electrodes.

Since nanostructured carbon and other carbonaceous materials are typically in the form of a fine powder, it is necessary to form the powder into a solid substrate for it to be physically used as an electrode. This may be accomplished, for example, by mixing the powder with a polymeric binder to form a carbon composite which can then be molded into the desired shape and heat treated. However, the use of a polymeric binder may have deleterious effects on the resulting electrical characteristics of the electrode since the binder itself is an insulating material. The use of a binder may also negatively influence the subsequent Pt/C interface.

A binder-free film comprised of carbon nanostructures may be formed on a suitable current collector by electrostatic spray deposition as disclosed, for example, by Kim. This results in a thin film comprising a porous, three-dimensional interconnected network of carbon nanohorns. The current collector may comprise a carbon sheet, non-porous metal, or a conductive polymer. Preferentially the carbon nanohorns are deposited on a metallic current collector such as an aluminum foil to a thickness of several microns. The nanohorns are aggregated into a three-dimensional interconnected network comprising pores with sizes on the order of tens of nanometers to facilitate ion access to intrapore surfaces. The carbon nanohorn electrodes are then introduced to an aqueous $H_2SO_4$ solution for several minutes to remove undesirable impurities, oxidize the carbon surfaces, and open up appropriately-sized nanowindows in enclosed nanohorn structures. After oxidation is complete the electrodes are emersed from solution and rinsed in deionized water for several minutes.

Once the carbon nanohorn electrode has been suitably oxidized, the next step involves the deposition of the desired metal overlayers. The following two sections detail the process steps used to fabricate Pt/C and Pt/Pd/C nanohorn electrodes. The latter process will be described with reference to FIG. 3.

A. Pt/C Nanostructures

In this embodiment, an atomically thin layer of Pt is deposited on the carbon nanohorn electrode by the ion adsorption, electrochemical reduction, and galvanic displacement process to produce Pt/C nanostructures. An oxidized carbon nanohorn electrode is initially immersed in an electrolyte solution which has been adjusted to have a pH suitable to generate a negative dipole at the oxidized carbon surface which points to the electrolyte solution. The creation of a negative dipole enables the subsequent adsorption of metal cations on the surface.

Once the surface of the oxidized nanohorns has been suitably prepared, they are immersed in a solution containing $Pb^{2+}$ ions at a predetermined temperature and for a suitable time period such that a desired quantity of $Pb^{2+}$ adsorbs on the surface. The substrate is then emersed from the solution and rinsed with deionized water. After the metal ions are adsorbed on the surface they are reduced. This may be accomplished chemically by treatment with a reducing agent such as, for example, $NaBH_4$, citric acid, hypophosphorous acid, or hydrazine. Alternatively, reduction may be accomplished by electrolytical treatment. This is done by subjecting the carbon nanohorn electrode to a suitable reducing potential. The final step involves exposing the carbon nanohorn electrode to a solution containing a Pt salt such as $K_2PtCl_4$ which replaces the adsorbed Pb atoms by galvanic displacement. The exposure time, solution concentration and temperature may be adjusted to ensure complete replacement of Pb by Pt.

It is to be understood that variations in the sequence of steps used in the above process may be employed without varying outside the scope of the present invention. For example, carbon nanohoms may be oxidized by immersion in $H_2SO_4$ before being formed into an electrode instead of after. In another example the carbon nanohoms may be deposited or grown directly onto the current collector. In still another example, during electrochemical film growth a cation other than $Pb^{2+}$ may be used as long as it is less noble than Pt. In yet another embodiment, a solution comprising one or more noble metal salts in the desired concentrations may be used to produce a thin film of Pt alloyed with one or more other noble metals.

Figure 2:
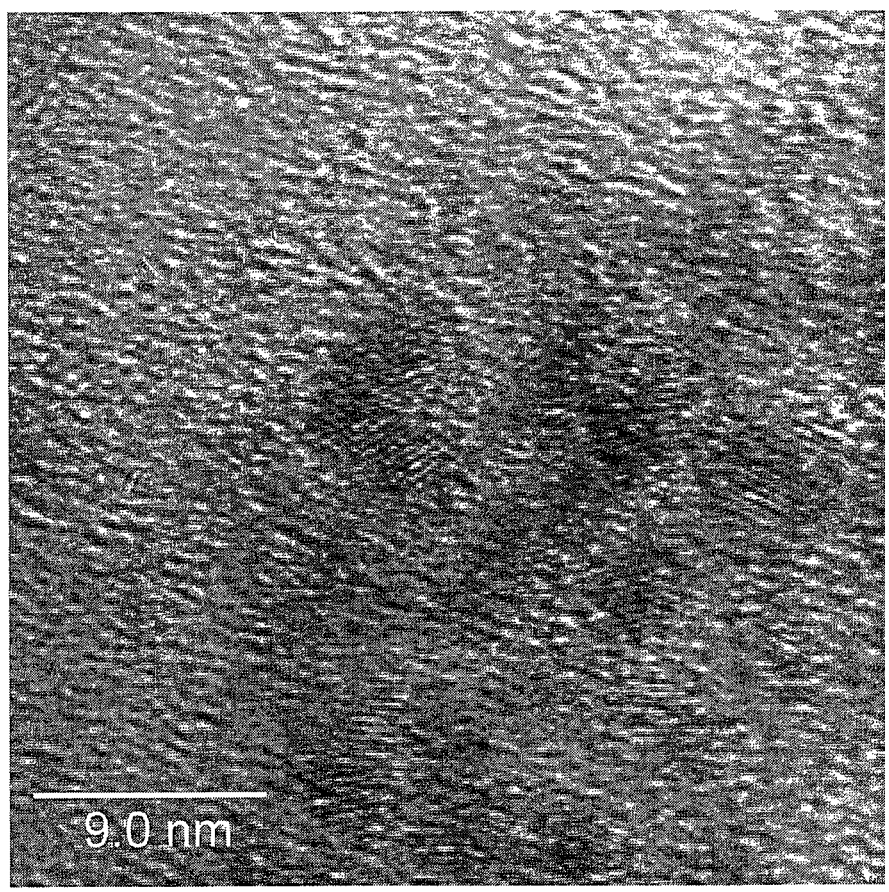
FIG. 2 is a transmission electron microscopy image which shows small, low-height platelets of Pt dispersed on the surface of a carbon substrate.

A transmission electron microscopy (TEM) micrograph which shows a plurality of low-height Pt platelets which have formed on an underlying carbon substrate is provided in FIG. 2. The carbon substrate is shown as an amorphous, lighter-colored grey background whereas the regions of the surface coated with. Pt are comparatively darker and exhibit lattice fringes, indicating some degree of crystalline order. The Pt platelets have an average diameter of approximately 3 to 5 nm.

Figure 3:
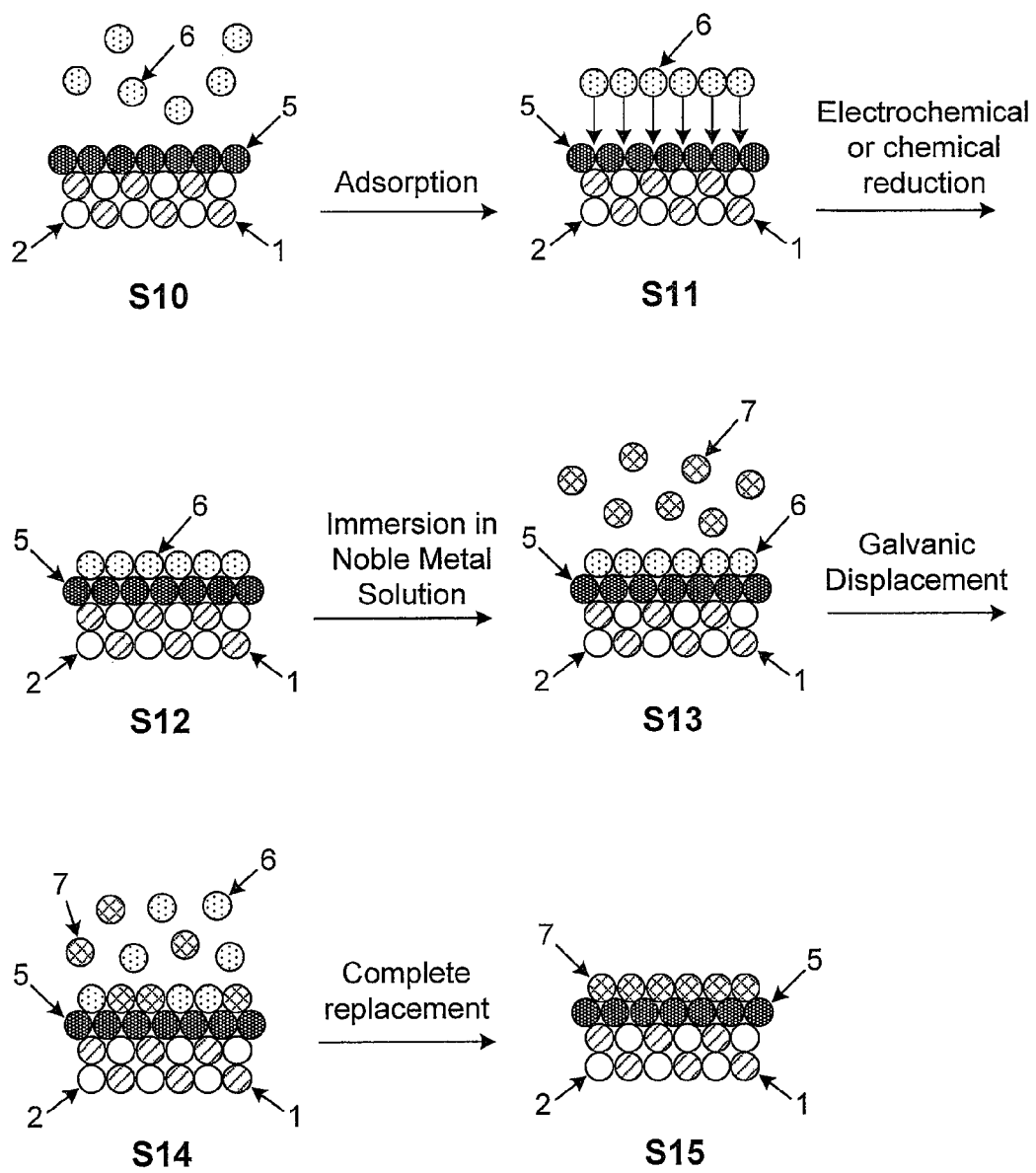
FIG. 3 shows a series of images illustrating the underpotential deposition of an adlayer of a transition metal onto a coated carbon nanostructure followed by the galvanic displacement of the thus-deposited adatoms by a more noble metal.

The sample shown in FIG. 2 was processed by initially oxidizing the surface of a sample of carbon black (Vulcan, XC-72) by immersion in a 1.0M sulfuric acid ($H_2SO_4$) solution containing 10 g of ammonium persulfate ($(NH_4)_2S_2O_8$) at room temperature for 12 hours (h). An electrode comprised of the oxidized carbon black was then immersed in a 1.0 mM solution of $Pb^{2+}$ ions for 2 h. Lead cations were adsorbed onto the oxidized carbon surface mainly through the formation of a surface complex between Pb and functional groups on the carbon surface by ion exchange of functional groups involving its valence change. The adsorbed $Pb^{2+}$ ions were then reduced by placing the electrode in a 0.1M $NaClO_4$ solution at a potential of –1,000 millivolts (mV) for 1 minute (min). The electrode was then immersed in a 1.0 mM solution of $Pt^{2+}$ ions for 5 min such that the adsorbed Pb is replaced with Pt through galvanic displacement. Although the TEM image provided in FIG. 3 shows a carbon sample that was subject to a single processing cycle, the steps of adsorbing $Pb^{2+}$ cations followed by galvanic displacement in a solution of $Pt^{2+}$ ions as described above can be repeated a plurality of times to produce a carbon surface that is covered with a substantially contiguous layer of Pt atoms.

B. Pt/Pd/C Nanostructures

In this embodiment, a Pd shell layer is initially formed on the oxidized carbon nanohorn electrode using the ion adsorption, electrochemical reduction, and galvanic displacement process described above. However, rather than using a Pt salt, a Pd salt such as $PdCl_2$ is used to replace adsorbed Pb atoms by galvanic displacement and produce a thin shell of Pd atoms. The sequence of steps followed to form the Pt surface layer on Pd/C carbon nanohorns are provided in FIG. 3. In the interest of clarity, only a representative portion of the Pd/C surface with carbon (1) and oxygen (2) atoms as well as a Pd (5) shell are shown.

Initially, non-noble metal ions of $Pb^{2+}$ (6) are adsorbed on the surface by immersing the Pd/C nanohorn electrode in a plating bath comprising the appropriate concentration of $Pb^{2+}$ ions (6) in step S10. UPD of Pb results in the adsorption of $Pb^{2+}$ ions (6) on the nanoparticle surface in step S11 and the formation of a monolayer of Pb (6) in step S12. This monolayer forms a continuous Pb "skin" around the periphery of the Pd/C nanohorns. The Pd/C nanohoms are then emersed from the bath and rinsed with deionized water to remove excess $Pb^{2+}$ (6) ions on the surface. The sample is maintained under a $N_2$ atmosphere during transfer to inhibit oxidation of the freshly deposited Pb adlayer (6). The Pd/C nanohorn electrode is then immersed in a solution comprising a Pt salt such as $K_2PtCl_4$ in step S13 where $Pt^{2+}$ ions (7) replace surface Pb adatoms (6) via a redox reaction as illustrated in step S14. Since Pt is more noble than Pb, it acts as an oxidizing agent by accepting electrons from Pb. The simultaneous reduction of $Pt^{2+}$ ions to Pt results in the replacement of surface Pb atoms (6) with Pt atoms (7). The final product is a Pt-coated Pd/C nanohorn electrode with a "skin" comprising a monolayer of Pt atoms as shown in step S15.

The cycle depicted in FIG. 3 may be repeated any number of times to deposit additional layers of Pt onto the surface of the Pd/C nanohorns to ensure complete coverage. Conversely, less than a monolayer of Pb may be deposited during UPD such that submonolayer coverages of Pt result. While only a portion of the surface of a single Pt/Pd/C nanohorn electrode is illustrated in FIG. 3, it is to be understood that Pt deposition will simultaneously occur on a large number of Pt/Pd/C nanohorns. The "skin" of Pt atoms will form a continuous and conformal coverage of the entire available surface area.

IV. Energy Conversion Devices

Exemplary energy conversion devices will now be described in detail below with reference to FIGS. 4-5. Each energy conversion device shown in FIGS. 4 and 5 includes at least one electrode comprising carbon nanostructures coated with a thin film of one or more noble metals.

A. Supercapacitors

Figure 4:
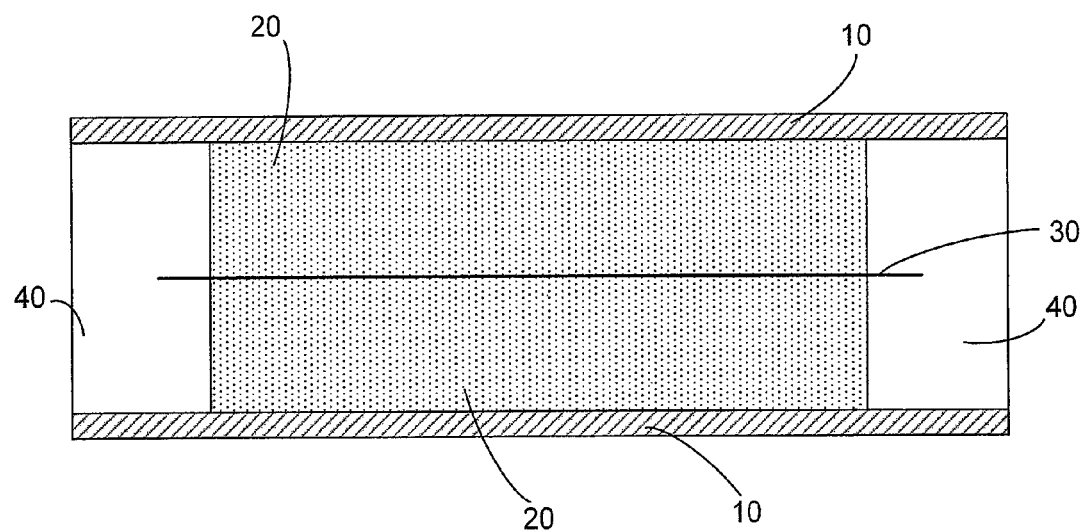
FIG. 4 is a cross-sectional schematic showing the structure of a typical supercapacitor fabricated from coated carbon nanostructure electrodes.

A cross-sectional schematic drawing (not drawn to scale) illustrating the structure of a typical supercapacitor is shown in FIG. 4. The supercapacitor comprises current collectors (10) which are in contact with a carbon nanohorn electrode (20). The carbon nanohom electrodes (20) have been chemically processed as described above to yield smooth and conformal thin films of Ru and Pd and hence produce Ru/Pd/C nanohom electrodes (20). It is to be understood that FIG. 4 is provided merely for illustrative purposes; the three-dimensional porous nature of the nanohoms and the conformality of the Ru and Pd layers is not apparent from FIG. 4. The Ru/Pd/C nanohorn electrode assembly (20) may be saturated with an electrolyte solution such that the electrodes (20) become impregnated with the electrolyte and a polarized electrode is formed. The electrolyte may be organic or inorganic with typical examples including water, ammonia, nitric acid, potassium hydroxide, and mixtures thereof.

Two Ru/Pd/C nanohorn electrodes (20) which have been prepared using the process described above are aligned such that they directly oppose each other as shown in FIG. 4. The electrodes (20) are separated by a thin separator layer (30), typically a semipermeable membrane. The separator layer (30) is electrically insulating yet permeable to ions within the electrolyte. Typical materials used for the separator layer (30) include polypropylene or some other thin semipermeable membrane. The entire assembly is bonded together and the electrolyte is circumferentially sealed by means of an annular gasket (40) which may be an electrically insulating rubber or synthetic resin.

Typical supercapacitors and their fabrication methods are disclosed, for example, in U.S. Pat. Nos. 6,454,816; 6,522,522; 6,697,249; 7,061,749; and 7,209,341 the entire contents of all of which may be utilized in carrying out the present invention. These patents and others presented in this specification describe conventional components such as current collectors, electrolytes, and separators which may be used in the present invention. These patents also present variations in supercapacitor design and operation which may also be incorporated.

By applying a positive and negative voltage to opposite current collectors (10), positive and negative ions are generated within the electrolyte. These ions then migrate to the respective oppositely charged current collector (10) where charge storage occurs. The improved charge storage capabilities and overall operational efficiency attainable with Ru/Pd/C-based supercapacitors will benefit potential applications in low-voltage consumer electronics such as backup power supplies for memories, microcomputers, or clocks. Higher voltage applications include electrical power load leveling, battery augmentation and pulse discharge applications such as wireless communication products or hybrid-electric and fuel-cell powered vehicles as well as residential or commercial energy storage apparatus.

B. Fuel Cells

The thus-formed Pt/Pd/C nanohorns may be fabricated into electrodes for use in fuel cells using standard manufacturing processes which are well-known in the art. Implementation as a fuel cell electrode is described, for example, in U.S. Patent Publ. No. 2006/0135,359 to Adzic. It is to be understood that there are many possible applications which may include, but are not limited to $H_2$ sensors, charge storage devices such as batteries, applications which involve corrosive processes, as well as various other types of electrochemical or catalytic devices.

Figure 5:
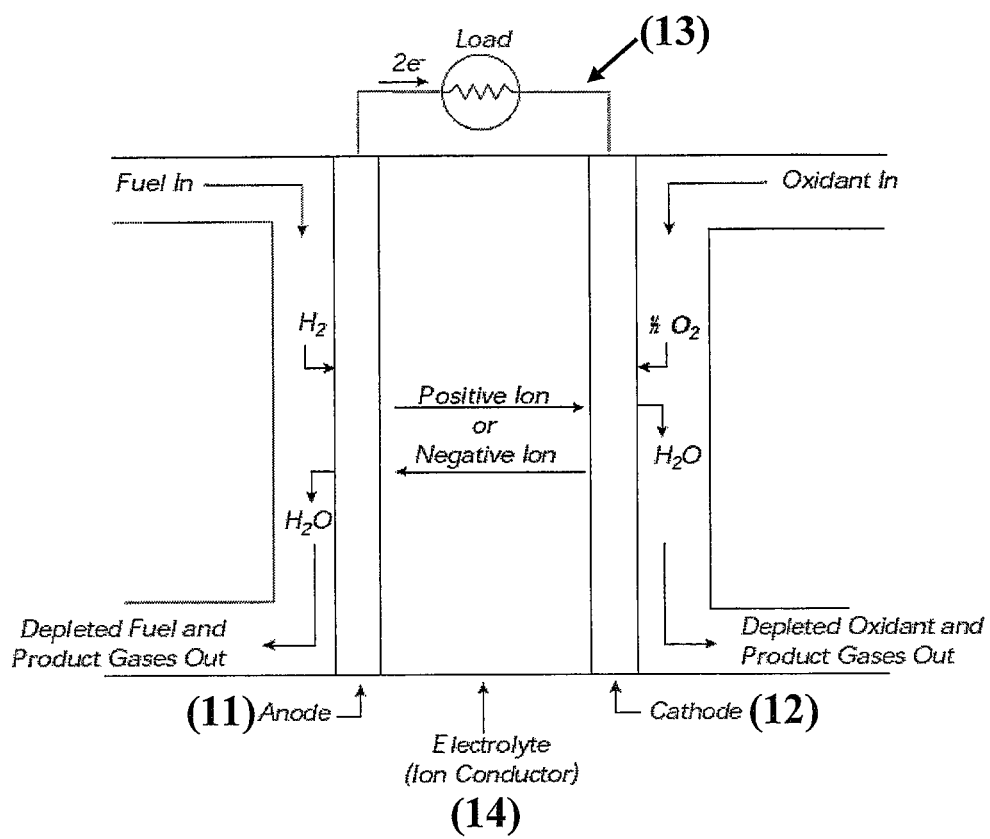
FIG. 5 is a schematic showing the principles of operation of a fuel cell in which at least one electrode is comprised of coated carbon nanostructures according to the present invention.

A schematic showing an example of a fuel cell and its operation is provided in FIG. 5. A fuel such as hydrogen gas ($H_2$) is introduced through a first electrode (11) whereas an oxidant such as oxygen ($O_2$) is introduced through the second electrode (12). In the configuration shown in FIG. 5, the first electrode (11) is the anode and the second electrode (12) is the cathode. At least one electrode is comprised of Pt-shell nanohorns which, in a preferred embodiment, have a noble metal shell. Under standard operating conditions electrons and ions are separated from the fuel at the anode (11) such that the electrons are transported through an external circuit (13) and the ions pass through an electrolyte (14). At the cathode (12) the electrons and ions combine with the oxidant to form a waste product which, in this case, is $H_2O$. The electrical current flowing through the external circuit (13) can be used as electrical energy to power conventional electronic devices. The increase in the ORR attainable through incorporation of Pt-shell nanohorns in one or more electrodes will produce an increase in the overall energy conversion efficiency of the fuel cell. Consequently, for a given quantity of fuel, a larger amount of electrical energy will be produced when using Pt-shell nanohorn electrodes compared to conventional nanoparticle electrodes.

It is to be understood that the use of Pt/C and Pt-shell/C nanohorn structures presented in this specification is not limited to supercapacitors and fuel cells, but may also find applications in capacitors, batteries, and other electrochemical processes or energy storage devices.

It will be appreciated by persons skilled in the art that the present invention is not limited to what has been particularly shown and described in this specification. Rather, the scope of the present invention is defined by the claims which follow. It should further be understood that the above description is only representative of illustrative examples of embodiments. For the reader's convenience, the above description has focused on a representative sample of possible embodiments, a sample that teaches the principles of the present invention. Other embodiments may result from a different combination of portions of different embodiments.

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. Patents, and U.S. Patent Application Publications cited throughout this specification are incorporated by reference as if fully set forth in this specification.

The invention claimed is:

1. A method of depositing conformal metal films on a plurality of carbon nanostructures comprising:
   depositing an atomically thin shell of a first transition metal by:
      oxidizing a surface of the carbon nanostructures;
      creating a dipole at the surface of the carbon nanostructures;
      adsorbing metal ions on the surface of the carbon nano structures;
      reducing the adsorbed metal ions; and
      replacing the adsorbed metal ions with the first transition metal which is more noble than the adsorbed metal ions; and
   depositing an atomically thin layer of a catalytically active noble metal on a surface of the atomically thin shell by
      depositing a contiguous adlayer of a second transition metal; and
      replacing the contiguous adlayer of the second transition metal with a second metal which is more noble than the second transition metal.

2. The method of claim 1 wherein the carbon nanostructures are selected from the group consisting of carbon nanotubes, nanohorns, nanocones, nanoparticles, nanofibers, graphene, and fullerenes.

3. The method of claim 2 further comprising forming carbon nanostructures by chemical vapor deposition, laser ablation, or arc discharge processes.

4. The method of claim 1 wherein the surface of the carbon nanostructures is oxidized by immersion in a sulfuric acid ($H_2SO_4$) solution containing ammonium persulfate (($NH_4)_2S_2O_8$) at room temperature.

5. The method of claim 4 wherein the surface of the carbon nanostructures is oxidized by immersion in a 1.0 M sulfuric acid ($H_2SO_4$) solution containing 10 grams of ammonium persulfate (($NH_4)_2S_2O_8$) at room temperature for 12 hours.

6. The method of claim 1 wherein the adsorbed metal ions are selected from the group consisting of $Pb^{2+}$, $Zn^{2+}$, $Cu^{2+}$, $Bi^{3+}$, Ti, $Cd^{2+}$, $Ag^+$, $Sn^{2+}$, $Hg^+$, $Sb^{3+}$, $Se^{4+}$, and $Te^{4+}$.

7. The method of claim 1 wherein the adsorbed metal ions are reduced by immersion in a $NaClO_4$ solution at a potential of −1,000 mV.

8. The method of claim 7 wherein the adsorbed metal ions are reduced by immersion in a 0.1M $NaClO_4$ solution at a potential of −1,000 mV for 1 minute.

9. The method of claim 1 wherein the adsorbed metal ions are replaced by immersing the carbon nanostructures in a solution comprising a salt of the first transition metal.

10. The method of claim 9 wherein the adsorbed metal ions are replaced by immersing the carbon nanostructures in a $Pt^{2+}$ solution.

11. The method of claim 10 wherein the adsorbed metal ions are replaced by immersing the carbon nanostructures in a 1.0 mM $Pt^{2+}$ solution for 5 minutes.

12. The method of claim 9 wherein the salt of the first transition metal comprises platinum, palladium, iridium, ruthenium, osmium, rhodium, gold, or rhenium.

13. The method of claim 12 wherein the salt of the first transition metal is selected from the group consisting of $K_2PtCl_4$, $PdCl_2$, $IrCl_3$, $RuCl_3$, $OsCl_3$, $RhCl_3$, $AuCl_3$, and $ReCl_3$.

14. The method of claim 1 wherein the contiguous adlayer of the second transition metal is deposited by underpotential deposition.

15. The method of claim 14 wherein the second transition metal consists of copper or lead.

16. The method of claim 15 wherein underpotential deposition is performed in a solution comprising $CuSO_4$.

17. The method of claim 1 wherein the contiguous adlayer of the second transition metal is replaced by immersing the carbon nanostructures in a solution comprising a salt of the second transition metal.

18. The method of claim 17 wherein the second transition metal comprises platinum.

19. The method of claim 18 wherein the salt of the second transition metal consists of $K_2PtCl_4$.

* * * * *